No. 614,572. Patented Nov. 22, 1898.
J. G. McNULTY.
METHOD OF AND APPARATUS FOR TREATING ORE.
(Application filed May 7, 1898.)
(No Model.) 2 Sheets—Sheet 1.

Witnesses
C. Bradway.
R. J. Stewart.

Inventor
J. G. McNulty
Attorney

No. 614,572. Patented Nov. 22, 1898.
J. G. McNULTY.
METHOD OF AND APPARATUS FOR TREATING ORE.
(Application filed May 7, 1898.)
(No Model.) 2 Sheets—Sheet 2.
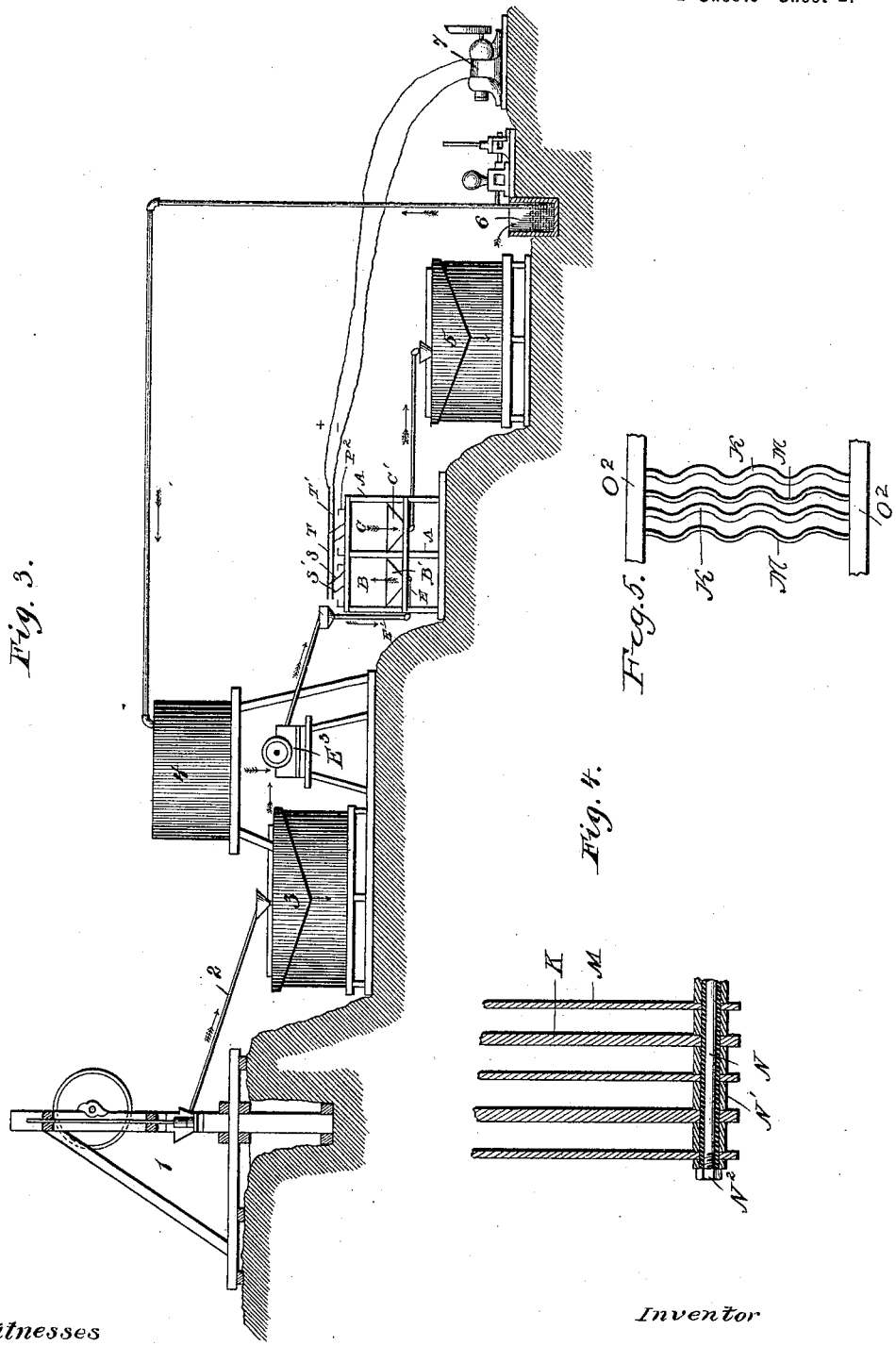
Witnesses
C. Bradway.
R. J. Stewart.
Inventor
J. G. McNulty.
Attorney.

UNITED STATES PATENT OFFICE.

JOSEPH G. McNULTY, OF NEW YORK, N. Y.

METHOD OF AND APPARATUS FOR TREATING ORES.

SPECIFICATION forming part of Letters Patent No. 614,572, dated November 22, 1898.

Application filed May 7, 1898. Serial No. 680,041. (No model.)

*To all whom it may concern:*

Be it known that I, JOSEPH G. MCNULTY, a citizen of the United States, residing at the city of New York, in the county of New York and State of New York, have invented certain new and useful Improvements in Methods of and Apparatus for Treating Ores; and I do hereby declare the following to be a full, clear, and exact description of the invention, such as will enable others skilled in the art to which it appertains to make and use the same.

This invention relates to the method of and apparatus for electrolytic extraction of precious metals from their ores and aims to provide means for subjecting the ore to a more effective course of treatment than heretofore practiced, one calculated to yield the maximum percentage of metal by reason of an exceedingly thorough agitation of the admixture of ore and chemical electrolyte without curtailing opportunity for deposition.

The invention dispenses with stirrers for agitating purposes, and consequently saves the expense of maintaining driving mechanism for such devices, while at the same time a movement of the mass of matter under treatment ensues, such as to fulfil every requirement as to agitation. The object of the vibration of the electrodes is to prevent the accumulation of air or gas globules or bubbles on the electrodes, which would cause electrical resistance and render the current less active in depositing the precious metal.

In carrying out my invention I propose to cause a properly-mixed mass of finely-pulverized ore and chemical electrolyte to pass from one level to another under regulated pressure through a vat in which a series of anode and cathode plates are suspended, and thence in like manner and, if required, through succeeding vats, each also having a series of anode and cathode plates suspended therein, vibrating motion being constantly imparted to the anode and cathode plates in each vat as the mass of matter flows between and around them.

The drawings which accompany and form a part of this specification illustrate a preferred construction embodying the invention and specifically described hereinafter, while the essential elements of the invention, without regard to details of construction, are recited in the appended claims.

Figure 1:
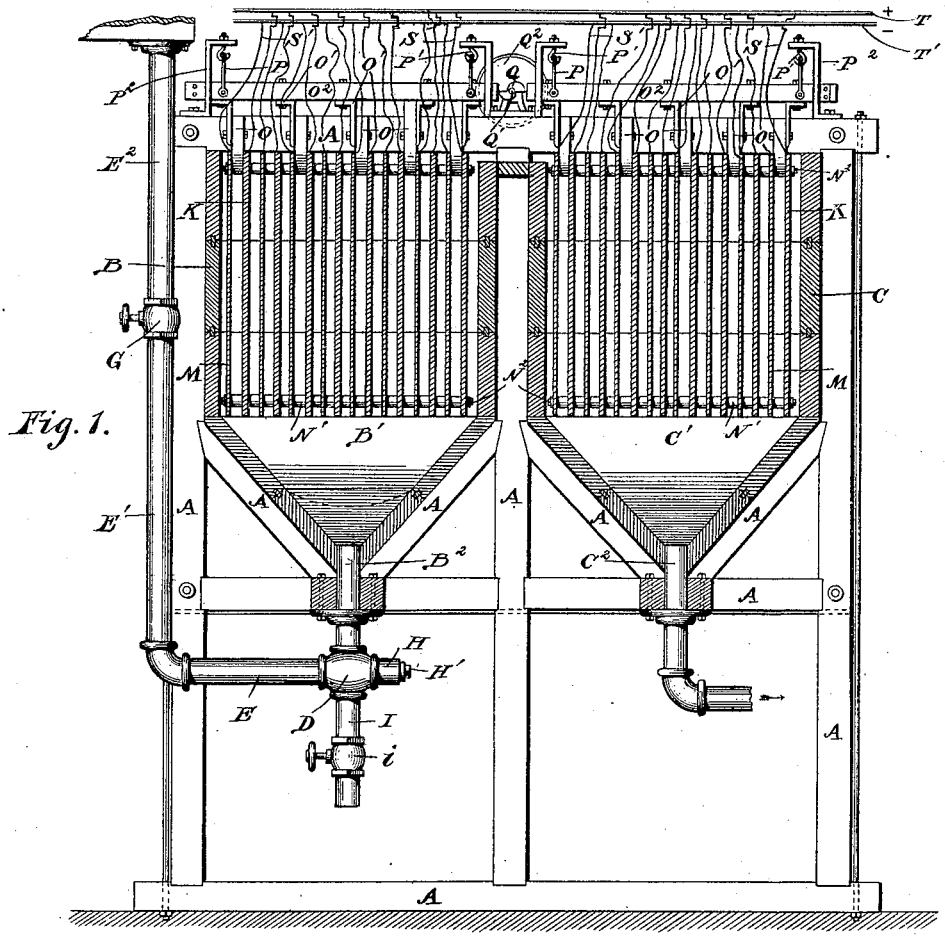
Figure 2:
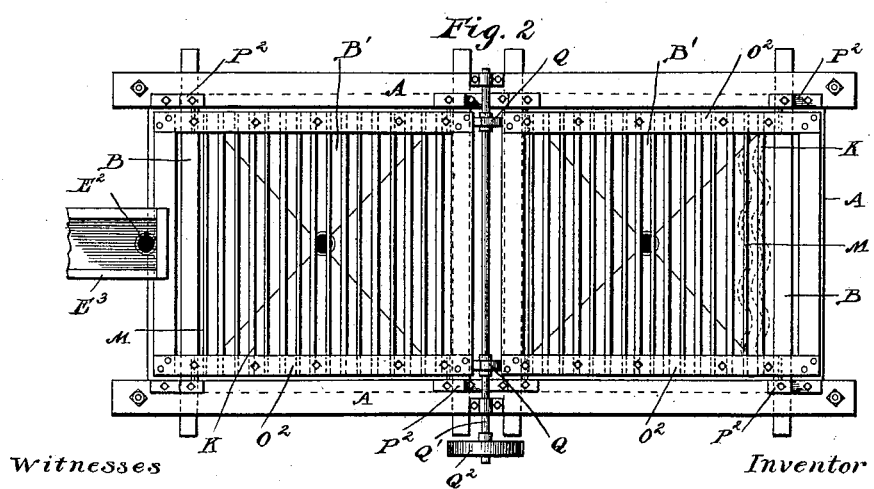

Of said drawings, Figure 1 represents the complete apparatus chiefly in longitudinal section, but with some parts in side elevation. Fig. 2 represents the apparatus in top plan view. Fig. 3 is a diagrammatic view illustrating my improvements in their relation to a plant. Fig. 4 is a detail in section of a part of an electrode structure. Fig. 5 is a detail showing the corrugated form of plates.

In the drawings the reference-letter A designates framework appropriately constructed to afford a substantial support for various parts of the apparatus hereinafter enumerated, including a pair of tanks, vats, or boxes B and C, located side by side, being in the instance shown of rectangular form with pyramidal bottoms B' and C', whose inverted apexes receive the ends of pipes $B^2$ and $C^2$, which are bolted through suitable flanges to appropriate portions of the framework.

The pipe $B^2$ connects with a four-way union D, one side branch of which receives the end of a horizontal section E of pressure-piping, also comprising vertical sections E' and $E^2$, extending somewhat above the plane of the tops of the vats and communicating with a feed-box or mechanical mixer $E^3$, which supplies the mixture of pulverized ore and chemical electrolyte. The elevation of this source of supply produces the pressure or "hydraulic head" for forcing the mass of matter through the apparatus. The flow can be regulated by means of a valve G, interposed between the sections E' and $E^2$ of the piping, the object being to so gage the velocity of the stream or mass of pulp as to keep the ore particles moving at a minimum rate and give them every opportunity to be acted upon by the electrolyte and the electric current in their journey through the apparatus. The other side branch of the four-way union D receives a horizontal nipple H, which is closed by a plug H', removable to give access for clearing the pressure-pipe of any obstruction to the proper flow of the pulp. The remaining branch of the union receives a pipe I, having a valve $i$, so that whenever desired it can be opened to discharge the deposit in the bottom of the vat, a suitable receptacle being placed beneath to receive the matter falling through said discharge-pipe.

A screen (indicated by dotted line, Fig. 1) of a prescribed mesh may be stretched across the lower part of the vat a short distance above the pipe with the object of effecting a distribution of the inflowing mixture of pulverized ore and electrolyte, which thence flows upward to electrodes of the following description: Alternating plates K and M constitute anodes and cathodes, respectively, the former being preferably composed of lead and the latter of copper coated with mercury. A considerable number of these plates, preferably coupled in series, are closely strung upon insulated rods N, of which four are here shown, with spacing-sleeves N' upon them between the plates, and taps or nuts $N^2$ screwing onto their ends and clamping the structure together. In place of these spacing-sleeves on the two upper rods between certain of the electrode-plates elongated blocks O are used, their projecting portions being bolted to angle-irons O', which are in turn bolted to the side bars of a frame $O^2$, the latter being suspended by bars or rods P from hooks P', fastened in horizontal arms of brackets $P^2$, mounted on the top bars of the framework A. It will thus be seen that the anode and cathode structure is supported so as to vibrate bodily in a direction substantially at right angles to the plane of the electrodes. It will be understood in this connection that the words "substantially at right angles" include such vibratory movements as will advance the plates of the electrode structure broadside through the pulp or liquid under treatment. Such vibration in the instance shown is effected by means of cams Q on a shaft Q', which is journaled in bearings on the top of the framework and carries a pulley $Q^2$ to receive rotating power from a suitable source. It will be understood, however, that other mechanical devices may be used instead of the arrangement shown.

The vat C contains an anode and cathode structure precisely like that just described as located in the vat B, and the vibratory supporting-frame R for the said electrode structure in the vat C is given vibratory motion by the same cams which operate upon the frame O. The anode and cathode plates of each structure are connected, respectively, by wires S and S' with electric conductors T and T', whereby the electric current is transmitted from a suitable source.

The vat C discharges through the pipe $C^2$ and any suitable connections therewith, it being understood that there is maintained a constant flow of pulp upwardly through the vat B and thence downward through the vat C, these two vats being in communication at their upper portions through any suitable conduit or overflow.

It will be observed that by virtue of the manner and under the condition which I cause the chemical electrolyte and its charge of pulverized ore to circulate unsurpassed facilities would be offered each individual ore particle to come within immediate and oft-repeated contact with the chemical electrolyte in its passage through the apparatus while exposed constantly to the action of the electric current. So soon as a given metallic particle of the circulating pulp has been taken up or dissolved by the action of the chemical electrolyte and the conditions prevailing, just so soon is the given particle deposited onto the cathode or collecting plates of the series by virtue of the electric current.

The amalgamated surface of the cathodes would to a great extent act also in a "mechanical" manner by collecting any chance particles of the precious metals present of such size that they may not have been entirely dissolved by the chemical electrolyte, but would be collected by the simple process of amalgamation upon coming in contact with the amalgamated cathode-surfaces. The action of the electrolyte would so brighten the particles of precious metal that they would readily amalgamate with the amalgamated surface of the cathode, as above indicated. From the manner in which I have the electrodes arranged a very large area is made operative. In fact, it might be said that they form practically an "electric sieve," through which the chemical electrolyte and its charge are constantly circulating.

In the upward and downward course of the pulp within the boxes of the apparatus each individual particle of ore is in suspension within the chemical electrolyte, continuously charged with an electric current and at the same time passing between the surfaces of the electrode series, so that the conditions are in every way most favorable for an intimate and complete action and reaction of the electrolyte upon and with the ore under treatment and the electrodes of the apparatus. Again, from the very manner in which the mixture of electrolyte and ore is caused to circulate through the apparatus all tendency of a scouring action of the ore particles upon the metals deposited on the electrodes is reduced to a minimum.

It will be seen that the electrode structures are readily removable from the vats and that the plates can be easily disconnected for cleaning purposes; but when an electrode structure is removed another will in practice be immediately substituted, so that the operation may proceed practically without interruption.

When the cathode-plates have been cleaned of deposits, they will preferably be recoated with mercury before being replaced in the structure and suspended in the vat.

It will be seen that the apparatus here shown and described can be economically constructed, maintained, and operated, and is compact in form.

Of course it is understood that the invention here disclosed is capable of embodiment in other forms than that I have chosen to illustrate and describe in detail in the present case.

It is evident that more than two vats might be employed in an apparatus constructed in accordance with my invention. Furthermore, the electrode-plates may be of various shapes, it sometimes being advantageous to give them a corrugated form, as shown in Fig. 5, to secure increased stiffness and greater surface and also to cause a wave motion in the pulp. Numerous other modifications will readily suggest themselves to those skilled in the art, all within the scope and spirit of the invention.

The apparatus herein described is to be used in conjunction with any suitable or preferred mill or plant—such, for instance, as is illustrated in Fig. 3, wherein 1 indicates an ore crusher or pulverizer communicating through duct 2 with a receptacle 3, wherein the water is drawn off from the pulverized ore. The pulverized ore is taken from the receptacle 3 to the mixer $E^3$, wherein it is combined with suitable proportions of electrolytic fluid fed in from the tank 4. The pulp after passing through the apparatus described is led to a suitable percolating-receptacle 5, wherein the electrolyte is separated from the tailings and led off to a tank 6, from whence it is pumped back into the tank 4, thus being used continuously, but enriched from time to time by the addition of any necessary ingredients to maintain it at a standard. In said figure I have shown the electrical conductors as attached to a dynamo 7.

A special feature of this improvement resides in the fact that by means of the apparatus described I am enabled to treat ores that are so finely pulverized that their treatment by an ordinary percolating system would be impracticable, as the charge would pack in the percolating-tanks and retard, if not suspend, the passage of the electrolytic fluid through the ore charge. As it is acknowledged that the finer the ore is pulverized the more readily a chemical medium of extraction can attack the minute particles of the precious metal contained therein, I am enabled by this apparatus to render profitable the extraction of gold from ores that worked by other apparatus known to me would produce no profit.

I claim—

1. The art of extracting precious metals from their ores, consisting in mixing pulverized ore with an electrolytic fluid, causing the mixture to flow from one level to another between adjacent electrode-plates of opposite polarity, passing an electric current between said plates and vibrating the electrodes in a direction substantially at right angles to the plane of said electrodes for the purpose of preventing the polarization thereof.

2. In apparatus for electrolytic treatment of ores, a tank or vat provided with an inlet and an outlet, at substantially different levels, whereby the pulp must flow from one level to another in passing through the vat, adjacent electrode-plates of opposite polarity suspended in the vat and the pulp and connected with a source of electric energy, and means for vibrating the electrodes in a direction substantially at right angles to their planes, substantially as described.

3. In apparatus for electrolytic treatment of ores the combination of a vat for containing a moving mass or stream of pulp consisting of pulverized ores and an electrolytic fluid, means for causing the pulp to flow through the vat, a removable electrode structure carrying adjacent electrode-plates of opposite polarity suspended within the vat and having necessary electrical connections, and means for vibrating said electrodes substantially at right angles to their planes, substantially as described.

4. In apparatus for electrolytic treatment of ores, the combination of a plurality of communicating vats operatively connected with a source of hydrostatic pressure each vat having an inlet and an outlet at substantially different levels, adjacent electrode-plates of opposite polarity suspended within said vats and connected with a source of electrical energy, and means for vibrating said electrodes in a direction substantially at right angles to their planes, substantially as described.

5. In apparatus for the electrolytic treatment of ores the combination of a plurality of vats arranged in pairs communicating at the top, adjacent electrode-plates of opposite polarity suspended within said vats and connected with a source of electricity, vibratory supports for said electrodes, means for vibrating the same at substantially right angles to their planes, a pressure-conduit for pulp leading to the bottom of the first vat to provide an upward current therethrough, and an exit at the bottom of the succeeding vat providing a discharge for the downward current of pulp overflowing from the top of the vat preceding, substantially as described.

In testimony whereof I affix my signature in presence of two witnesses.

JOSEPH G. McNULTY.

Witnesses:
G. W. McNULTY,
H. DE RAASLOFF.